(12) United States Patent
Breslau et al.

(10) Patent No.: US 6,421,736 B1
(45) Date of Patent: Jul. 16, 2002

(54) METHOD AND SYSTEM FOR MIGRATING AN OBJECT BETWEEN A SPLIT STATUS AND A MERGED STATUS

(75) Inventors: Franklin Charles Breslau, Teaneck, NJ (US); Paul Gregory Greenstein, Croton-On-Hudson; John Ted Rodell, Wappingers Falls, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/882,680

(22) Filed: Jun. 25, 1997

Related U.S. Application Data

(62) Division of application No. 08/579,544, filed on Dec. 27, 1995.

(51) Int. Cl.[7] ................................................. G06F 9/44
(52) U.S. Cl. ....................................... 709/315; 709/105
(58) Field of Search ................................ 395/600, 353, 395/800, 182.09, 200, 62; 364/200; 709/100, 104, 105, 303, 304, 315, 316, 330, 226

(56) References Cited

U.S. PATENT DOCUMENTS

| | | | | |
|---|---|---|---|---|
| 4,403,286 A | * | 9/1983 | Fry et al. ..................... | 364/200 |
| 4,495,570 A | * | 1/1985 | Kitajima et al. ............ | 364/200 |
| 4,853,843 A | * | 8/1989 | Ecklund ...................... | 364/200 |
| 5,179,702 A | * | 1/1993 | Spix et al. ................... | 395/650 |
| 5,187,786 A | * | 2/1993 | Densmore et al. .......... | 395/600 |

(List continued on next page.)

FOREIGN PATENT DOCUMENTS

| | | | | |
|---|---|---|---|---|
| EP | 0 553 560 A2 | 8/1993 | ............. | G06F/9/46 |
| EP | 0 636 970 A2 | 2/1995 | ............. | G06F/9/44 |
| JP | PUPA06-348666 | 12/1994 | | |
| JP | PUPA07-044383 | 2/1995 | | |
| JP | PUPA07-123108 | 5/1995 | | |

OTHER PUBLICATIONS

Moons et al. "Object Migration in a Heterogeneous World—A Multi–Dimensional Affair", IEEE, pp. 62–72, 1993.*
Corradi et al. "Distributed Environments Based on OBjects: Upgrading SmallTalk Toward Distribution", IEEE pp. 332–339, 1990.*
Bebers et al. "The XENOOPS Project", IEEE pp. 144–146, 1991.*
Ciampolini et al. "The Benefits of Migration in a Parallel Objects Programming Environment", IEEE pp. 291–298, 1994.*
Mendelzon et al. "Object Migration", ACM pp. 232–242, May 1994.*
Steensgaard et al. "Object and Native Code Thread Mobility Among Heterogeneous Computers", ACM pp. 68–78, Dec. 1995.*
Rogers et al. "Supporting Dynamic Data Structures on Distributed–Memory Machines", ACM pp. 233–263, 1995.*
IBM Technical Disclosure Bulletin "Single System Image and Load Balancing for Network Access to a Loosely Coupled Complex" IBM Corp. vol. 34 No. 9 pp. 464–467, 2/92.*
Decouchant "Design of a Distributed Object Manager for the SmallTalk–80 System".*

(List continued on next page.)

Primary Examiner—St. John Courtenay, III
Assistant Examiner—Sue Lao
(74) Attorney, Agent, or Firm—Heslin Rothenberg Farley & Mesiti P.C.

(57) ABSTRACT

In an object-oriented computer system, an object can exist in a split state or a merged state. When in the split state, the object has multiple instances. When in the merged state, the object has a single instance. A request for migrating the object between the split state and the merged state is identified. In response thereto, the object is migrated there between. The object's state is preserved during the migration by consolidating the state of multiple instances of the object, or by copying the state of a single, merged, instance of the object.

6 Claims, 6 Drawing Sheets

ORB ROUTING TABLE

| OBJECT ID | SPLITTABLE | LOCATION | SIP |
|---|---|---|---|
| OBJECT_A | N | HOST | 0 |
| OBJECT_C1 | N | WORKSTATION_A | 0 |
| OBJECT_C2 | N | WORKSTATION_B | 0 |
| OBJECT_C3 | N | WORKSTATION_C | 0 |
| OBJECT_B | Y | | |

SPLIT ROUTING TABLE

| OBJECT ID | SPLITTABLE | LOCATION | SIP |
|---|---|---|---|
| OBJECT_B1 | N | WORKSTATION_A | 0 |
| OBJECT_B2 | N | WORKSTATION_B | 0 |
| OBJECT_B3 | N | WORKSTATION_C | 0 |

U.S. PATENT DOCUMENTS

| | | | |
|---|---|---|---|
| 5,280,610 A | * 1/1994 | Travis, Jr. et al. | 395/600 |
| 5,315,709 A | * 5/1994 | Alston, Jr. et al. | 395/600 |
| 5,349,682 A | * 9/1994 | Rosenberry | 395/800 |
| 5,377,350 A | * 12/1994 | Skinner | 395/600 |
| 5,488,723 A | * 1/1996 | Baradel et al. | 709/303 |
| 5,504,894 A | * 4/1996 | Ferguson et al. | 709/100 |
| 5,517,643 A | * 5/1996 | Davy | 395/650 |
| 5,561,740 A | * 10/1996 | Barrett et al. | 395/62 |
| 5,619,710 A | * 4/1997 | Travis, Jr. et al. | 395/800 |
| 5,701,484 A | * 12/1997 | Artsy | 709/303 |
| 5,706,458 A | * 1/1998 | Koppolu | 395/353 |
| 5,812,779 A | * 9/1998 | Ciscon et al. | 395/200.53 |
| 5,838,894 A | * 11/1998 | Horst | 395/182.09 |

OTHER PUBLICATIONS

Okamura et al., "Object Migration in Distributed Reflective Programming Systems," Objective Orienting Computing II, pp. 47–54, Kindaikagaku Co., Ltd., Apr. 10, 1994.

Okamura et al., "AL–1/D: A Distributed Programming System with Reflective Facilities", Objective Orienting Computing I, pp. 1–16, Kindaikagaku Co., Ltd., Jul. 1, 1993.

* cited by examiner

ORB ROUTING TABLE

| OBJECT ID | SPLITTABLE | LOCATION | SIP |
|---|---|---|---|
| OBJECT_A | N | HOST | 0 |
| OBJECT_C1 | N | WORKSTATION_A | 0 |
| OBJECT_C2 | N | WORKSTATION_B | 0 |
| OBJECT_C3 | N | WORKSTATION_C | 0 |
| OBJECT_B | Y | HOST | 0 | fig. 6

ORB ROUTING TABLE

| OBJECT ID | SPLITTABLE | LOCATION | SIP |
|---|---|---|---|
| OBJECT_A | N | HOST | 0 |
| OBJECT_C1 | N | WORKSTATION_A | 0 |
| OBJECT_C2 | N | WORKSTATION_B | 0 |
| OBJECT_C3 | N | WORKSTATION_C | 0 |
| OBJECT_B | Y | | |

SPLIT ROUTING TABLE

| OBJECT ID | SPLITTABLE | LOCATION | SIP |
|---|---|---|---|
| OBJECT_B1 | N | WORKSTATION_A | 0 |
| OBJECT_B2 | N | WORKSTATION_B | 0 |
| OBJECT_B3 | N | WORKSTATION_C | 0 | fig. 7

METHOD AND SYSTEM FOR MIGRATING AN OBJECT BETWEEN A SPLIT STATUS AND A MERGED STATUS

CROSS REFERENCE TO RELATED PATENT APPLICATIONS

This application is a division of application Ser. No. 08/579,544 filed Dec. 27, 1995 which application is now pending.

The present Patent Application relates to the following commonly owned and concurrently or previously filed U.S. Patent Applications.

"METHOD AND SYSTEM FOR RUN TIME OBJECT INSTANCE MANAGEMENT," Ser. No. 08/579,542, filed herewith on Dec. 27, 1995, and "METHOD AND SYSTEM OF DYNAMICALLY MOVING OBJECTS BETWEEN HETEROGENEOUS EXECUTION ENVIRONMENTS," Ser. No. 08/578, 098, filed herewith on Dec. 27,1995.

The above referenced U.S. Patent Applications are hereby expressly incorporated by reference herein in their entireties.

TECHNICAL FIELD

The present invention relates in general to object-oriented computer systems. More specifically, the present invention relates to managing instances of objects, and in particular, to a method and system for migrating an object between a merged status having a single instance and a split status having multiple instances.

BACKGROUND OF THE INVENTION

Current computer programming techniques include the use of Object-Oriented Programming ("OOP"). Object-Oriented Programming centers on reusable, self-contained, callable program code modules known in the art as "objects." Such a modular approach makes software development more efficient and reliable through the use and reuse of proven, tested objects.

Each object is designed to accomplish a predefined set of operations through "methods." These methods include programmed tasks for the object to perform when called upon to do so (i.e., invoked). Each particular method is defined within a "class" associated with an object. The class acts as a template that describes the behavior of a group of similar objects. An object is instantiated from (or is a runtime instance of) a selected class, and includes methods and attributes (or data) defined in the class.

Objects are shared resources that may be invoked (i.e., by invoking their methods) by other objects throughout the object-oriented computer system. The load on an object (and the corresponding load on the execution environment it is instantiated within) will therefore vary with the periodicity of invocations of the object and complexity of the methods used within the object. Careful system planning is required such that enough instances of any particular object are available to handle the presented load. However, problems are associated with this planning.

One problem associated with load planning involves object naming. Each object instantiated in a conventional object-oriented computer system is registered in an object manager and identified with a unique name. Invocations of the object are performed through use of the object manager and the object's unique name. Therefore, if multiple instances of an object are created in a computer system, they must each be separately identified and invoked. Each invoker is therefore assigned the identifier of a unique instance of the object in the computer system. If it becomes desirable to invoke a different instance of the object, the identifier that an invoker uses must be changed. Managing these changes in object-oriented computer systems that have multiple (e.g., hundreds or thousands) invokers and object instances is unmanageable.

In further regard to the problems of load planning, one solution to increasing the capacity of a single instance of an object would be to move the object to an execution environment with greater processing capacity. Such a solution is described in the co-pending U.S. Patent Application entitled "METHOD AND SYSTEM OF DYNAMICALLY MOVING OBJECTS BETWEEN HETEROGENEOUS EXECUTION ENVIRONMENTS," Ser. No. 08/578,098, filed herewith. However, a single other execution environment with sufficient processing capacity may not always exist.

The present invention is directed toward solutions to the above noted problems.

SUMMARY OF THE INVENTION

In a first aspect, the present invention operates in an object-oriented computer system that includes an object and at least one invoker. The object is invocable by the at least one invoker.

In particular, the present invention comprises a method of managing the object at runtime and includes identifying a request to migrate the object between a split status and a merged status. The split status comprises the object having at least two instances, and the merged status comprises the object having a single instance. The object is migrated, at runtime, between the split status and the merged status. Despite the object being having the split or merged status, the object is invocable in a same way by the at least one invoker.

As an enhancement, the object may have an identifier assigned thereto for invocation thereof. This identifier is maintained for invoking the object, despite the object having the split or merged status. Further, the object-oriented computer system may include a routing table used by an object manager to track objects. If the object is migrated from the split status to the merged status, then the single instance is assigned to the identifier within the routing table. If the object is migrated from the merged status to the split status, then the at least two instances are assigned to the identifier within the routing table.

As a further enhancement, the object may have a state comprising invocation persistent values. The method may include preserving the state of the object during the migrating. More particularly, if the object is migrated from the merged status to the split status, the method may include copying the state of the single instance to the at least two instances. If the object is migrated from the split status to the merged status, the method may include consolidating the state of the at least two instances and copying the state to the single instance of the object.

In another aspect, the present invention operates in an object-oriented computer system that includes an object and at least one invoker. The object is invocable by the at least one invoker. The present invention includes a method of managing the object at run-time, and includes providing multiple instances of the object. Each instance of the multiple instances of the object is a candidate for invocation upon an invocation of the object. An invocation of the object is received. Particularly, the invocation identifies the object and is indescriptive of the multiple instances of the object. In response to the invocation, an instance of the multiple instances is invoked.

As an enhancement, the method includes determining which instance of the multiple instances of the object to invoke during the invoking. The determining may be performed using a predefined heuristic for the object. Further, the invoking may include informing the invoked instance about the multiple instances of the object in the object-oriented computing system.

A method corresponding to the above-described system is further disclosed herein.

To summarize, the present invention has multiple advantages and features associated with it. Creating multiple instances of an object, on multiple execution environments, facilitates improved performance of the object. A single object identifier is used to invoke the object, despite how many instances of it exist. Thus, according to the present invention, these multiple instances are creatable and invocable in a transparent manner to invokers of the object. Furthermore, the migration of an object between a split and merged status is performable at run time such that dynamic system flexibility and change are enhanced.

BRIEF DESCRIPTION OF THE DRAWINGS

The subject matter regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which:

FIG. 6 depicts one example of an "ORB" ("Object Request Broker") Routing Table corresponding to the system configuration of FIG. 2 pursuant to one embodiment of the present invention; and FIG. 7 depicts an example of an ORB Routing Table and a Split Object Routing Table corresponding to the system configuration of FIG. 3 in accordance with an embodiment of the present invention.

DETAILED DESCRIPTION OF A PREFERRED EMBODIMENT

The techniques of the present invention facilitate a transparent runtime migration of an object from a single instance to multiple instances. When the object is instantiated as a single instance, the object is referred to herein as having a "merged" status. When the object is instantiated as multiple instances, the object is referred to herein as having a "split" status. Invocations of the object are performed the same way, whatever the status (i.e., split or merged) of the object. In particular, the object is always invoked using the same object identifier, and resulting from invocation, either the single instance of the object (i.e., when merged) or an appropriate one of the multiple instances of the object (i.e., when split) is invoked. Advantageously, because the identifier of the object never changes, the change to the status of the object (e.g., split or merged) is transparent to invokers thereof.

The techniques disclosed herein are described in connection with terminology and resources that will be apparent to one of ordinary skill in the art. In one example, the terminology and resources described herein are associated with the Common Object Request Broker Architecture ("CORBA"—a registered trademark of the Object Management Group, Inc.), an international standard for object management resources. One example of an entity included in CORBA type systems is an object manager known as an Object Request Broker ("ORB"), which is responsible for, e.g., creation, deletion and tracking of objects. A particular implementation of the CORBA standard is International Business Machines' System Object Model ("SOM") Objects Toolkit ("SOMobjects"). Further descriptions of CORBA and SOMObjects may be found in, e.g., "CORBA—A Guide To Common Object Request Broker Architecture," by Ron Ben-Natan, McGraw-Hill, 1995 and "AIX Version 4.1 SOMobjects Base Toolkit User's Guide," IBM, 1993, Publication No. SC23-2680-01, and "AIX Version 4.1 SOMobjects Base Toolkit Programmers Reference Manual," IBM 1993, Publication No. SC23-2681-01, which are incorporated herein by reference in their entireties. CORBA is only one example of an object-oriented environment within which the techniques disclosed herein will operate. The present invention is compatible with any object-oriented environment that includes an object manager (e.g., The Object Request Broker-ORB of CORBA) which enables transmittal of information between objects and provides object transparency (e.g., "Microsoft's Common Object Manager" and the "Visual Age" environment from "IBM CORP.").

Figure 1:
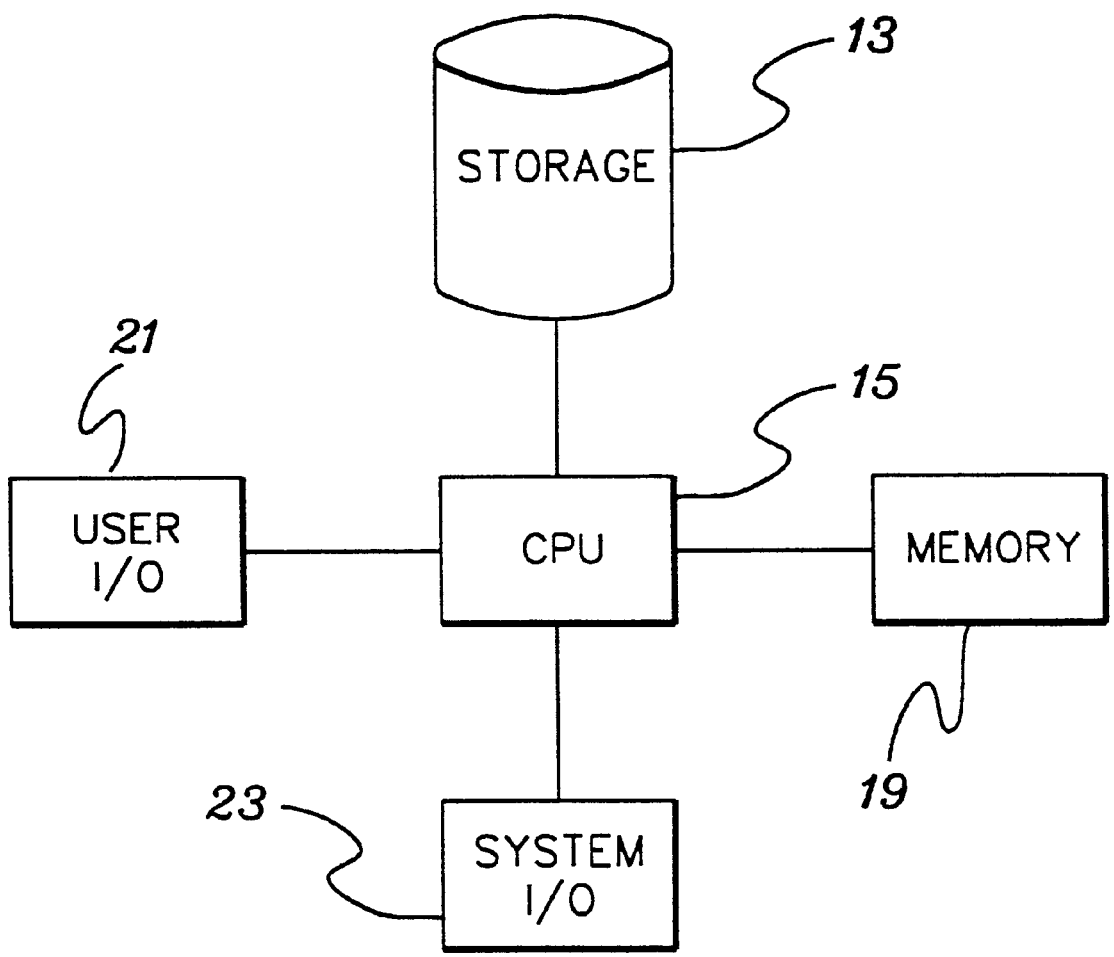
FIG. 1 is one example of a computer system useful in implementing the techniques of the present invention.

One example of the hardware elements of a single execution environment computer system used to implement the techniques of the present invention is shown in FIG. 1. A central processing unit ("CPU") 15 provides main processing functionality. A memory 19 is coupled to CPU 15 for providing operational storage of programs and data. Memory 19 may include, for example, random access memory ("RAM") or read only memory ("ROM"). Non-volatile storage of, for example, data files and programs is provided by a storage 13 that may include, for example, disk storage. Both memory 19 and storage 13 are computer usable media that may store computer program products as computer readable program code. User input and output are provided by a user input/output ("I/O") facility 21. User I/O facility 21 may include, for example, a graphical display, a mouse and/or a graphics tablet. System input and output are provided by a system I/O facility 23 (e.g., a network adapter). As will be understood in the art, other I/O facilities may be included based upon system configuration (e.g., between storage 13 and CPU 15). As one computer system example, the computer system of FIG. 1 may be an "IBM APTIVA" Personal Computer System executing an "IBM OS/2 WARP" operating system.

The techniques of the present invention enable the runtime migration of an object between a merged status and a split status. As one example of an object-oriented computer system having an object with a merged status, reference is made to FIG. 2. Depicted therein is an object-oriented computer system that includes four execution environments, namely three "INTEL" processor-based workstations (workstation A 31, workstation B 33 & workstation C 35) and an "IBM SYSTEM/390" class mainframe-based host computer ("host") 37. The execution environments are interconnected by, e.g., a "TOKEN-RING" network 55 to facilitate communication there between. However, any conventional hardware/software networking scheme may be used in connection with the techniques disclosed herein. Workstations A 31, B 33 and C 35 ("workstations") are designed to interact with users through graphical user terminals 38, 39 & 41 (e.g., each including a monitor, mouse and keyboard), respectively, while host 37 is intended as a database server that accesses stored information on a disk 43.

Both host 37 and the workstations are part of the object-oriented computer system depicted. In regard thereto, a database related object A 53 executes in host 37, and graphical user interface related objects C1 45, C2 47 and C3 49 execute in their respective workstations. An object B 51 performs a function that does not necessarily have to execute on either the workstations or host 37 (i.e., it is not intimately tied to either a disk or graphical interface). For example, object B 51 could perform a numerical computation. In the environment depicted in FIG. 2, object B 51 executes in host 37.

Figure 2:
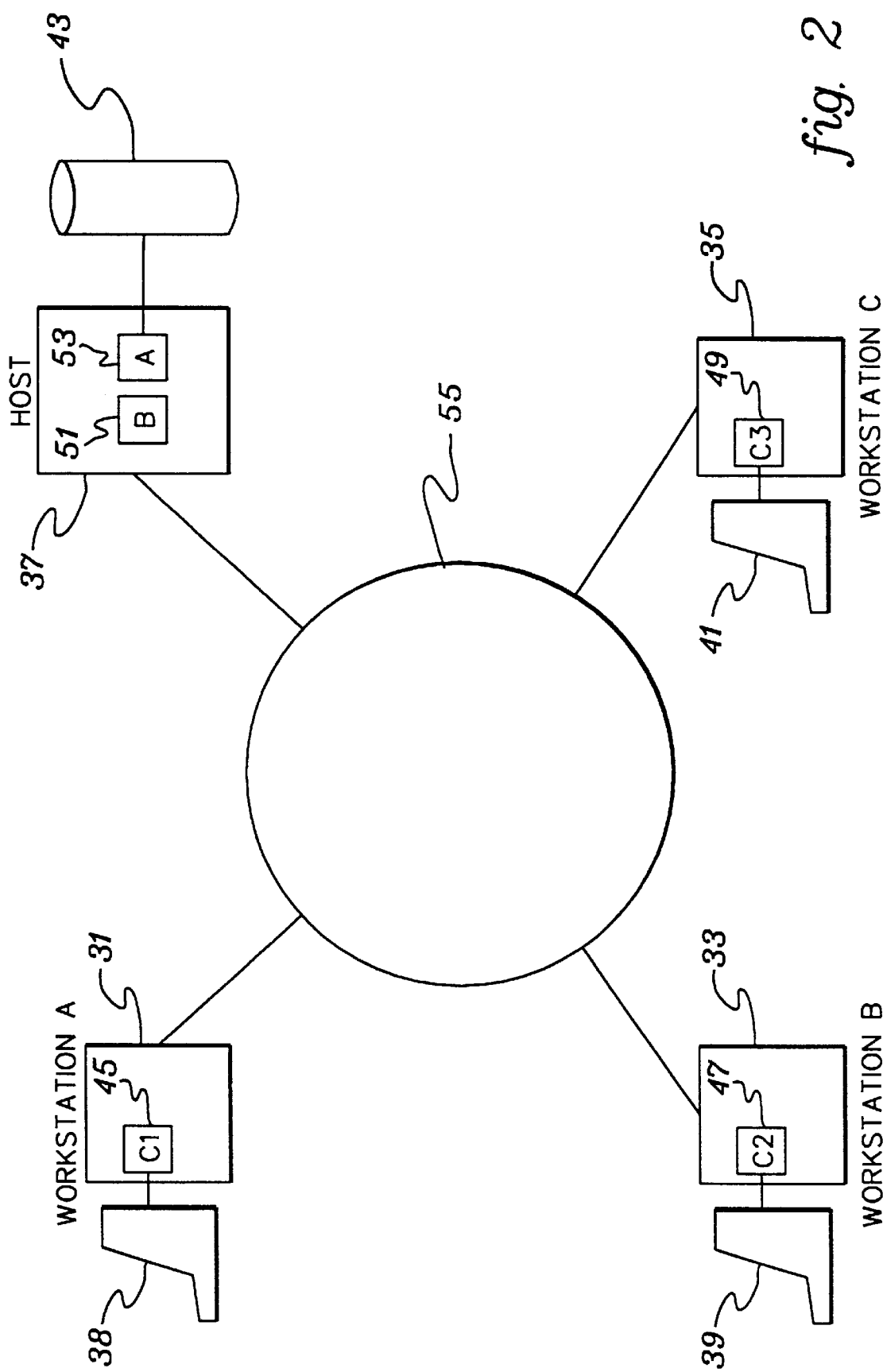
FIGS. 2–3 depict one example of the migration of an object between a split status and a merged status pursuant to one embodiment of the present invention.

Although the techniques of the present invention are described herein regarding the system configuration of, e.g., FIG. 2, one of ordinary skill in the art will understand that the present invention may be used in association with any object-oriented computer system having any particular system configuration and distribution of objects therein. For example, the workstations may be heterogeneous with respect to one another.

During runtime system operation, it may become desirable (or even necessary) to increase the processing capacity of object B 51. For example, the load on object B 51 may become too great for host 37 to service properly. According to the techniques of the present invention, the single instance, object B 51 is "split" into three instances thereof depicted in FIG. 3 (and in this example, thereafter deleted). For example, the three split instances shown are an object B1 61 within workstation A 31, an object B2 63 within workstation B 33 and an object B3 65 within workstation C 35. Each of these instances are instantiated from the same class (or classes) and are therefore functionally identical.

As used herein, objects B 51, B1 61, B2 63 and B3 65 are all to be considered different instances of the same "object B," wherein object B 51 represents a single instance version of "object B" and objects B1 61, B2 63 and B3 65 represent multiple instances of object B. It will be understood by one of ordinary skill in the art that regarding the physical presence of each instance on each execution environment, the instance may be viewed as a discrete object to the operating software of its execution environment. However, each instance is associated with a single object identifier in the ORB.

The techniques of the present invention facilitate continued invocation of "object B" even when split into the three instances (e.g., objects B1 61, B2 63 and B3 65). The ORB autonomously directs invocations of "object B" to an appropriate instance thereof, without the invoker ever having to know that a merged status to a split status transition has occurred. Advantageously, performance is increased by making three instances of "object B" available, while transparency of the object's state (i.e., split or merged) from an invoker's point of view, is maintained.

Figure 4:
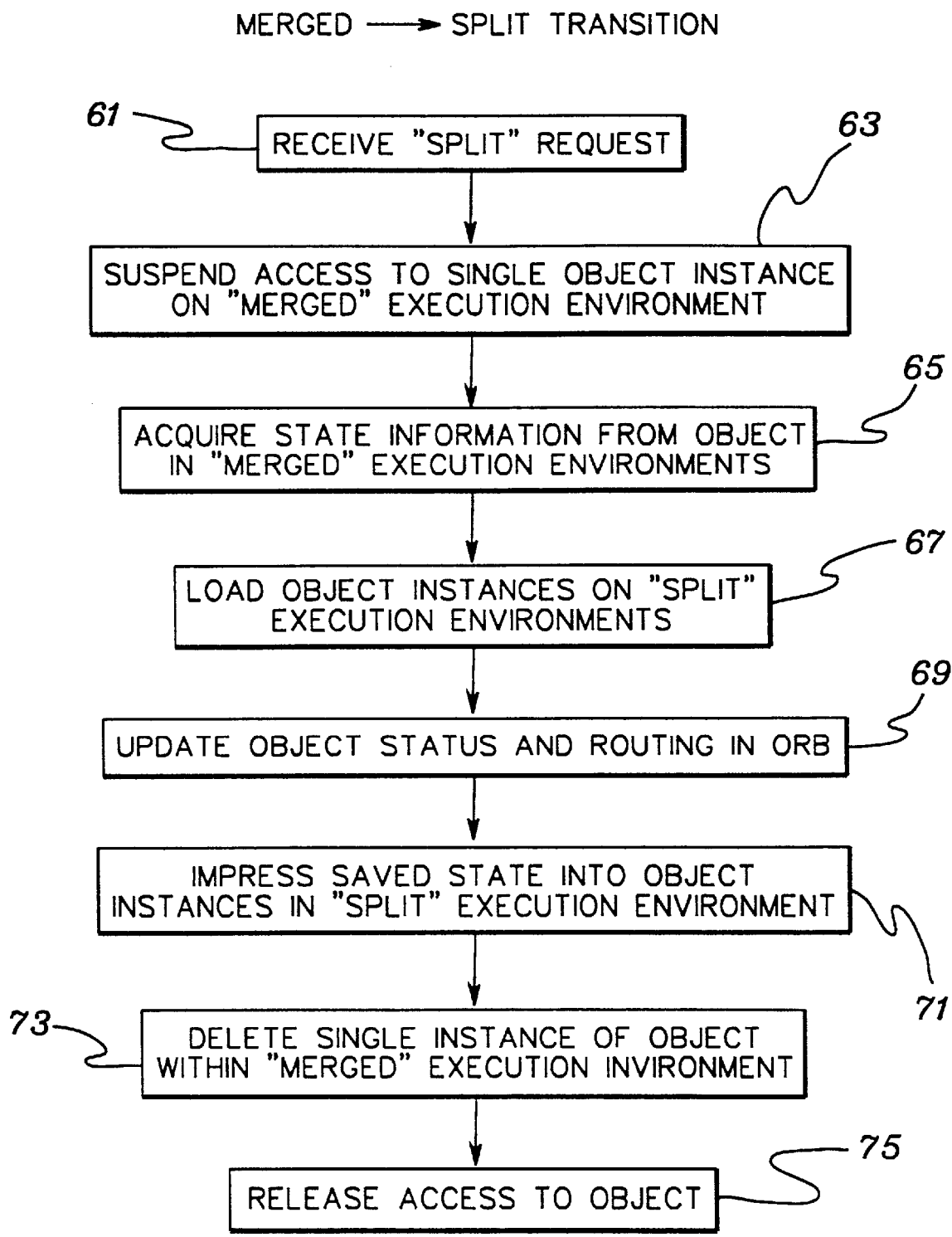
FIGS. 4–5 depict flow diagrams of methods for migrating the status of an object between a split and a merged status according to an embodiment of the present invention.

A process for migrating an object from a merged status (i.e., having a single instance) to a split status (i.e., having multiple instances) is described below with respect to the flow-diagram of FIG. 4. This process is implementable as a separate program within the object-oriented computer system, or may be included as the method of an object within the object-oriented computer system, including, e.g., the object being "split" or "merged."

The process begins with the generation and/or receipt of a "split" request (STEP 61). This may be generated by another program or object executing within the object-oriented computer system. As one example, the split request may be generated by a performance monitoring program that has determined an overload condition for a "merged" object within an execution environment. For example, with respect to the example object-oriented computer system of FIGS. 2–3, a performance monitor may detect that the single instance, object B 51 is overloaded on host 37, and accordingly generates a "split" request therefor, to predetermined execution environments determined by the heuristics of the performance monitor. A parameter list is passed from the performance monitor to the current process that enumerates the locations where the split instances are to be placed. The parameter list also indicates whether the original "merged" instance is kept intact.

Access to the object (e.g., object B 51) is suspended such that the object is not invoked while the "merged" to "split" transition process executes (STEP 63). This suspension is performable using conventional semaphore processing and in, e.g., an IBM MVS ("Multiple Virtual Storage") operating system, this suspension of access is performable using an exclusive ENQ ("Enqueue") system macro.

Optionally, the state information accumulated within the object being "split" may be acquired (STEP 65). As known in the art, as an object is repeatedly invoked, certain variables within the object may persist between invocations such that the information contained thereby is accumulated. For example, an object may include an invocation persistent variable that tracks the total number of times an object has been invoked. This accumulated information is known as the "state" of the object and may be important to methods of the object. Thus, saving the "state" of the object facilitates preservation and reimpression thereof into the "split" instances of the object once created. The saving and reimpression of state information are described in detail in "METHOD AND SYSTEM OF DYNAMICALLY MOVING OBJECTS BETWEEN HETEROGENEOUS EXECUTION ENVIRONMENTS," Ser. No. 08/578,098, filed herewith on Dec. 27, 1995, which is hereby incorporated herein by reference in its entirety.

A next step in the process includes instantiating multiple instances of the object being split into multiple execution environments (STEP 67). For example, in FIG. 3, multiple instances of "object B" (e.g., objects B1 61, B2 63 and B3 65) are loaded into the workstations. The creation of an object within an execution environment is conventional. However, according to the techniques disclosed herein, the tracking of the "split" objects is performed using some variation on the object routing information contained within the ORB (STEP 69). As will be discussed in further detail below, the new "split" instances of, e.g., "object B" are all associated with the same single object identifier previously associated with the single instance, object B 51 (i.e., when "merged").

The saved state of the object being "split" may be impressed into the multiple instances of the object after they have been successfully created (STEP 71). If the state of the object had not been previously saved, this step is unnecessary.

As final steps, the single instance of the object on the "merged" execution environment is deleted (STEP 73), and access to object B is enabled (STEP 75). Deletion of the single instance of the object includes the conventional removal of the object from the memory of the "merged" execution environment, and removal of the name of the "merged" execution environment from the appropriate ORB table entries associated with the object. Regarding object access, in, e.g., an "MVS" operating system, permitting access is performable using a DEQ ("Dequeue") system macro.

Figure 5:
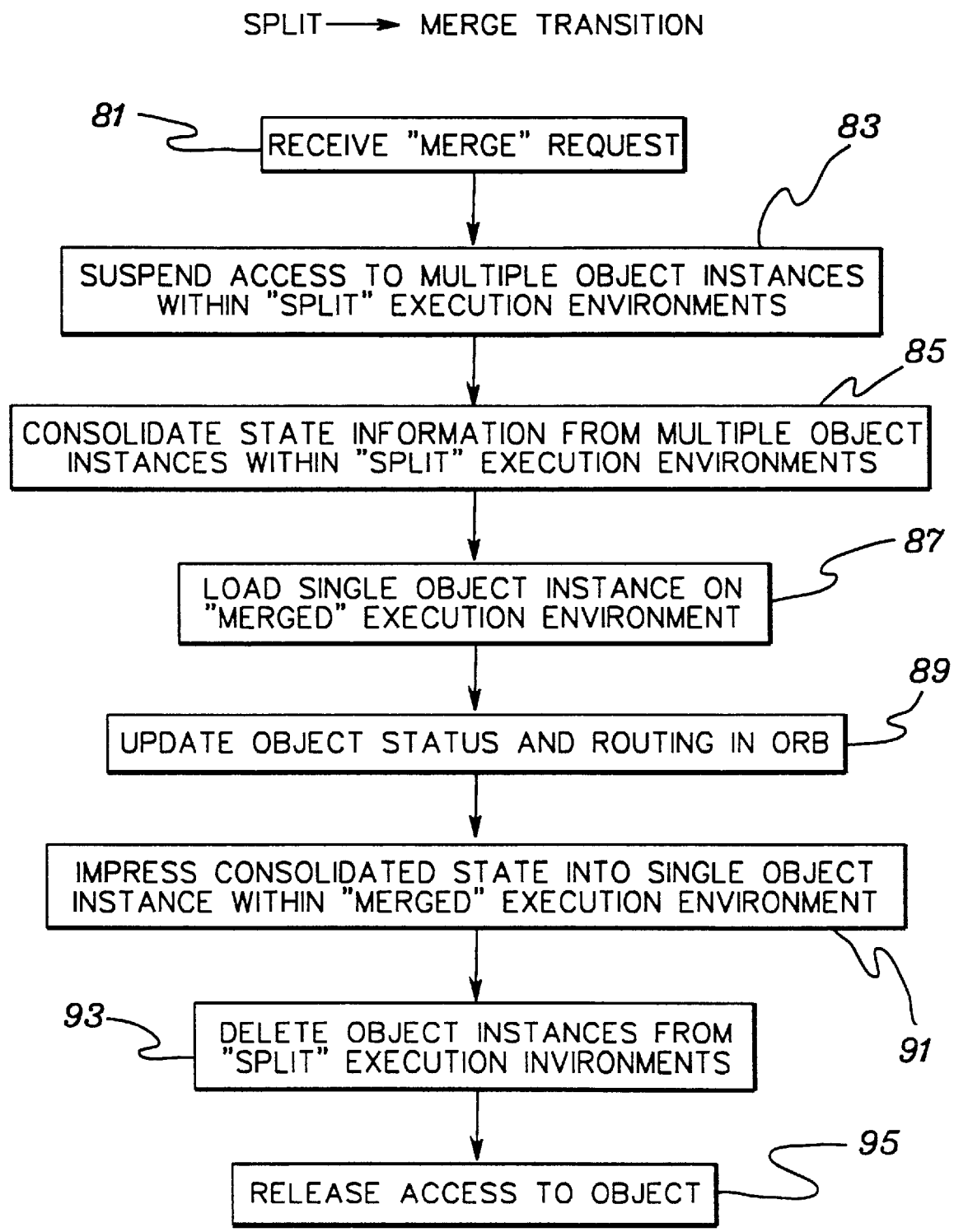

The complementary process to that of FIG. 4, for migrating an object from a split status (i.e., having multiple instances) to a merged status (i.e., having a single instance) is described below with respect to the flow-diagram of FIG. 5. As with the process of FIG. 4, this process is implementable as a separate program within the object-oriented computer system, or may be included as a method of an object within the object-oriented computer system, including, e.g., the object being split or merged.

The process begins with the generation of a "merge" request (STEP 81) by, e.g., another program or object executing within the object-oriented computer system. As one example, the merge request may be generated by a performance monitoring program that has determined that only a single instance of the "split" object is needed.

Access to the multiple instances of the "split" object is suspended such that they are not invoked during the split to merge transition process (STEP 83). This suspension is performable using conventional semaphore processing and in, e.g., an "MvS" operating system, this suspension is performable using an exclusive ENQ system macro.

Optionally, the state information accumulated within the multiple instances of the "split" object may be consolidated (STEP 85). The individual steps of the consolidation will vary with the type of state data maintained and the object logic, and the individual steps required for such consolidation will be apparent to one of ordinary skill in the art in view of this disclosure and the other patent applications incorporated herein. For example, if the accumulated state data includes, e.g., a non-redundant list of network nodes, the consolidation method would include appending the node list from each "split" instance into a single list, and then removing redundancy of nodes therefrom.

A next step in the process includes instantiating the single instance of the object being "merged" onto a single execution environment (STEP 87). For example, in a transition from FIG. 3 to FIG. 2, the multiple instances of "object B" including objects B1 61, B2 63 and B3 65 are deleted from the workstations, and single instance object B 51 is loaded into host 37. The associated ORB tables are updated such that only the single execution environment of the "merged" object instance is associated with the object identifier (STEP 89). Thus, all invocations of the object will be directed to the single instance, object B 51.

The consolidated state of the object as "split" may next be impressed into the single "merged" object instance (STEP 91). (As discussed previously, if the state of the object had not been previously saved, this step is unnecessary.) For instance, the consolidated node list discussed above may be impressed after the "merged" object is instantiated (STEP 91). As final steps, the multiple "split" instances of the object are deleted (STEP 93) and access to the "merged" object is enabled (STEP 95). Deletion of the object's multiple instances includes the conventional removal of the objects from the memory of the "split" execution environments, and removal of the names of the "split" execution environments from the appropriate ORB table entries associated with the object. Concerning access, in, e.g., an "MVS" operating system, permitting access is performable using a DEQ system macro.

ORB table management, according to the techniques of the present invention, is discussed below. Conventionally, an ORB Routing Table tracks objects registered within the object-oriented computer system. Included in this table is an identifier for each object, along with pertinent information associated therewith. For example, the name of the particular execution environment the object is loaded within is stored in the table along with each object's identifier. According to the techniques of the present invention, modification to the ORB routing table is performed to support objects having split and merged status.

Shown in FIG. 6 is an example of an ORB Routing Table corresponding to the computer system configuration depicted in FIG. 2. Each entry within the table includes an object identifier ("OBJECT ID") and the execution environment that the corresponding object instance is loaded within ("LOCATION"). By way of example, each object instance shown in FIG. 2 is represented in the ORB Routing Table of FIG. 6. In particular, object A 53 is within host 37, object C1 45 is within workstation A 31, object C2 47 is within workstation B 33, object C3 49 is within workstation C 35 and object B 51 is within host 37. A "splittable" field is included for each object identifier and indicates whether the object can be split using the techniques disclosed herein. The "splittable" indicator is set by the object as part of the registration with the ORB. For example, it may be passed as a parameter to the ORB registration function. Also, a Split Instance Pointer ("SIP") points to a secondary routing table for split instances. If the object is not split, a null is stored in the SIP.

Figure 3:
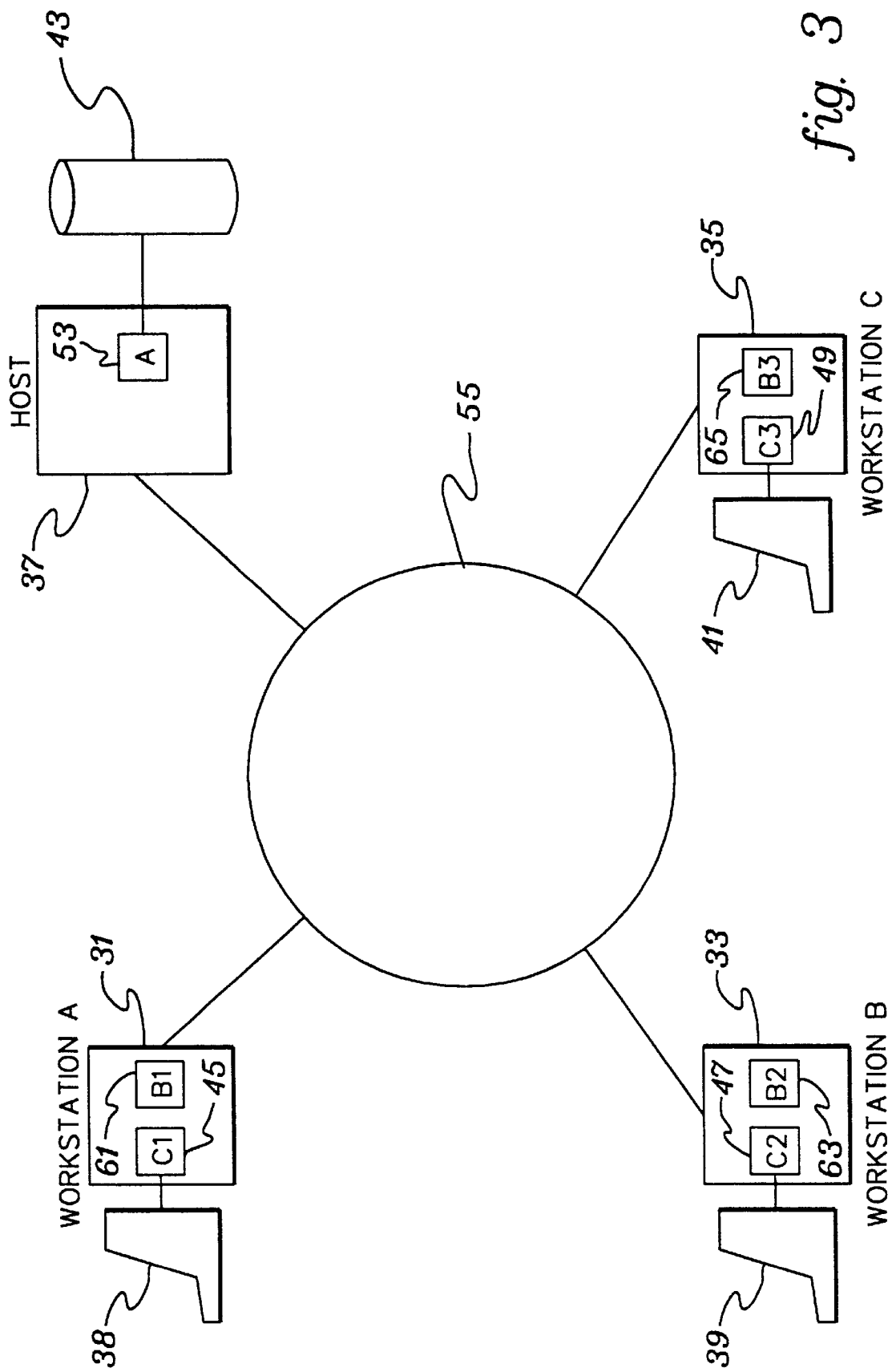

The ORB Routing Table of FIG. 7 corresponds to the system configuration of FIG. 3, wherein "object B" has been split into multiple instances thereof, namely objects B1 61, B2 63 and B3 65. The techniques of the present invention track these multiple instances using a "Split Routing Table" for each split object. As shown in FIG. 7, the object identifier "Object_B" is associated with a SIP corresponding to a Split Routing Table for Object B. Each entry within this Split Routing Table contains the name of each "object B" instance, along with the name of the execution environment that the instance is within. Specifically, object B1 61 is within workstation A 31, object B2 63 is within workstation B 33 and object B3 65 is within workstation C 35. Thus, using these tables in connection with conventional ORB functionality, the identification, tracking and instantiation of the "split" instances of an object, e.g., "object B," are facilitated. If the merged instance of object B were maintained, the identifier "object B" would be maintained in the ORB routing table location field denoting a "partially split" state of object B.

As an enhancement, because the split routing table is identically structured with the ORB routing table, the split instances themselves may be further "split" using a recursive application of the foregoing techniques.

When the ORB receives an invocation request for an object that has a split status, the ORB must decide which of the multiple instances of the object to invoke. The heuristic used to make such a decision will vary by object purpose and application. One example of a usable heuristic would be, e.g., a round-robin selection scheme based upon the list of instances within the Split Routing Table. Other heuristics may use information regarding the execution environment on which the invocation originated (conventionally available). For example, if an invocation originates from an execution environment that has an instance of the requested object thereon, that instance would be invoked. Other factors influencing the selection of an instance could include the network delay, physical closeness, or bandwidth available between the execution environment originating the invocation and candidate execution environments that have an instance of the requested object thereon.

A further feature of the present invention includes informing an object, upon invocation, whether it has a split or a merged status. If an object is merged, and therefore contains only one instance, a conventional invocation of it would inherently inform the object that it exists as a merged object. If the object has a split status, the ORB may pass the invoked instance of the object a dedicated parameter upon invocation to indicate its "split" status. The ORB will know when it handles the invocation of an instance of a split object, because reference to a Split Routing Table is required to process the invocation. The invoked object instance may then use this knowledge of its split/merged status within its methods.

The present invention has multiple advantages and features associated with it. Creating multiple instances of an object, on multiple execution environments, facilitates improved performance of the object. A single object identifier is used to invoke the object, despite how many instances of it exist. Thus, according to the present invention, these multiple instances are creatable and invocable in a transparent manner to invokers of the object. Furthermore, the migration of an object between a split and merged status is performable at run time such that dynamic system flexibility and change are enhanced.

While the invention has been described in detail herein, in accordance with certain preferred embodiments thereof, many modifications and changes thereto may be affected by those skilled in the art. Accordingly, it is intended by the appended claims to cover all such modifications and changes as fall within the true spirit and scope of the invention.

We claim:

1. In an object-oriented computer system including an object having an executable method defined by class source code and at least one invoker, wherein said object is invocable by said at least one invoker, a method of managing said object at runtime to dynamically respond to system processing load requirements, said method comprising:
   (a) identifying requests to migrate said object back and forth between a split status and a merged status to respond to said system load requirements, said split status comprising said object having at least two instances for handling a first system load requirement, and said merged status comprising said object having fewer instances for handling a second system load requirement; and
   (b) transparently and repeatedly migrating, at run-time, said object back and forth between said split status and said merged status, wherein said object is invocable a same way using a common object identifier by said at least one invoker, despite said object having one of a split status and a merged status;
   wherein said object has an identifier assigned thereto for invoking said object, and wherein said method includes maintaining said identifier for invoking said object despite said object having one of said split status and said merged status; and
   wherein said object-oriented computer system includes a routing table, said migrating comprises migrating from said merged status to said split status, and said method includes assigning said at least two instances to said identifier within said routing table.

2. In an object-oriented computer system including an object having an executable method defied by class source code and at least one invoker, wherein said object is invocable by said at least one invoker, a method of managing said object at runtime to dynamically respond to system processing load requirements, said method comprising:
   (a) identifying requests to migrate said object back and forth between a split status and a merged status to respond to said system load requirements, said split status comprising said object having at least two instances for handling a first system load requirement, and said merged status comprising said object having fewer instances for handling a second system load requirement; and
   (b) transparently and repeatedly migrating, at run-time, said object back and forth between said split status and said merged status, wherein said object is invocable a same way using a common object identifier by said at least one invoker, despite said object having one of a split status and a merged status;
   wherein said object has a split status and a split instance in one of said at least two instances, and wherein said method further comprises splitting said split instance into at least two more instances thereof in said object-oriented computer system.

3. In an object-oriented computer system including an object having an executable method defined by class source code and at least one invoker, wherein said object is invocable by said at least one invoker, an apparatus used in managing said object at runtime to dynamically respond to system processing load requirements, said apparatus comprising:
   (a) means for identifying requests to migrate said object back and forth between a split status and a merged status to respond to said system load requirements, said split status comprising said object having at least two instances for handling a first system load requirement, and said merged status comprising said object having fewer instances for handling a second system load requirement; and
   (b) means for transparently and repeatedly migrating, at run-time, said object back and forth between said split status and said merged status, wherein said object is invocable a same way using a common object identifier by said at least one invoker, despite said object having one of a split status and a merged status;
   wherein said object has an identifier assigned thereto for invoking said object, and wherein said apparatus includes means for maintaining said identifier for invoking said object, despite said object having one of said split status and said merged status; and
   wherein said object-oriented computer system includes a routing table, said means for migrating comprises means for migrating from said merged status to said split status, and said apparatus includes means for assigning said at least two instances to said identifier within said routing table.

4. In an object-oriented computer system including an object having an executable method defined by class source code and at least one invoker, wherein said object is invocable by said at least one invoker, an apparatus used in managing said object at runtime to dynamically respond to system processing load requirements, said apparatus comprising:

(a) means for identifying requests to migrate said object back and forth between a split status and a merged status to respond to said system load requirements, said split status comprising said object having at least two instances for handling a first system load requirement, and said merged status comprising said object having fewer instances for handling a second system load requirement; and (b) means for transparently and repeatedly migrating, at run-time, said object back and forth between said split status and said merged status, wherein said object is invocable a same way using a common object identifier by said at least one invoker, despite said object having one of a split status and a merged status;

wherein said object has a split status and a split instance in one of at least two execution environments, and wherein said apparatus further comprises means for splitting said split instance into at least two more instances thereof in said object-oriented computer system.

5. An article of manufacture comprising computer readable code means embodied therein for an object-oriented computer system including an object having an executable method defined by class source code and at least one invoker, wherein said object is invocable by said at least one invoker, said article of manufacture for managing said object at runtime to dynamically respond to system processing load requirements, said article of manufacture comprising:

(a) code means for identifying requests to migrate said object back and forth between a split status and a merged status to respond to said system load requirements, said split status comprising said object having at least two instances for handling a first system load requirement, and said merged status comprising said object having fewer instances for handling a second system load requirement; and (b) code means for transparently and repeatedly migrating, at run-time, said object back and forth between said split status and said merged status, wherein said object is invocable a same way using a common object identifier by said at least one invoker, despite said object having one of a split status and a merged status;

wherein said object has an identifier assigned thereto for invoking said object, and wherein said article of manufacture further includes code means for maintaining said identifier for invoking said object, despite said object having one of said split status and said merged status; and wherein said object-oriented computer system includes a routing table, and wherein said code means for migrating comprises code means for migrating from said merged status to said split status, and said article of manufacture further includes code means for assigning said at least two instances to said identifier within said routing table.

6. An article of manufacture comprising computer readable code means embodied therein for an object-oriented computer system including an object having an executable method defined by class source code and at least one invoker, wherein said object is invocable by said at least one invoker, said article of manufacture for managing said object at runtime to dynamically respond to system processing load requirements, said article of manufacture comprising:

(a) code means for identifying requests to migrate said object back and forth between a split status and a merged status to respond to said system load requirements, said split status comprising said object having at least two instances for handling a first system load requirement, and said merged status comprising said object having fewer instances for handling a second system load requirement; and (b) code means for transparently and repeatedly migrating, at run-time, said object back and forth between said split status and said merged status, wherein said object is invocable a same way using a common object identifier by said at least one invoker, despite said object having one of a split status and a merged status;

wherein said object has a split status and a split instance in one of at least two execution environments, and wherein said article of manufacture further comprises code means for splitting said split instance into at least two more instances thereof in said object-oriented computer system.

* * * * *